T. DUYSENS, J. R. H. DE JONG & H. L. KNEPPERS.
ROTARY ENGINE.
APPLICATION FILED NOV. 11, 1907.
950,478.
Patented Mar. 1, 1910.
5 SHEETS—SHEET 5.
Fig. V.
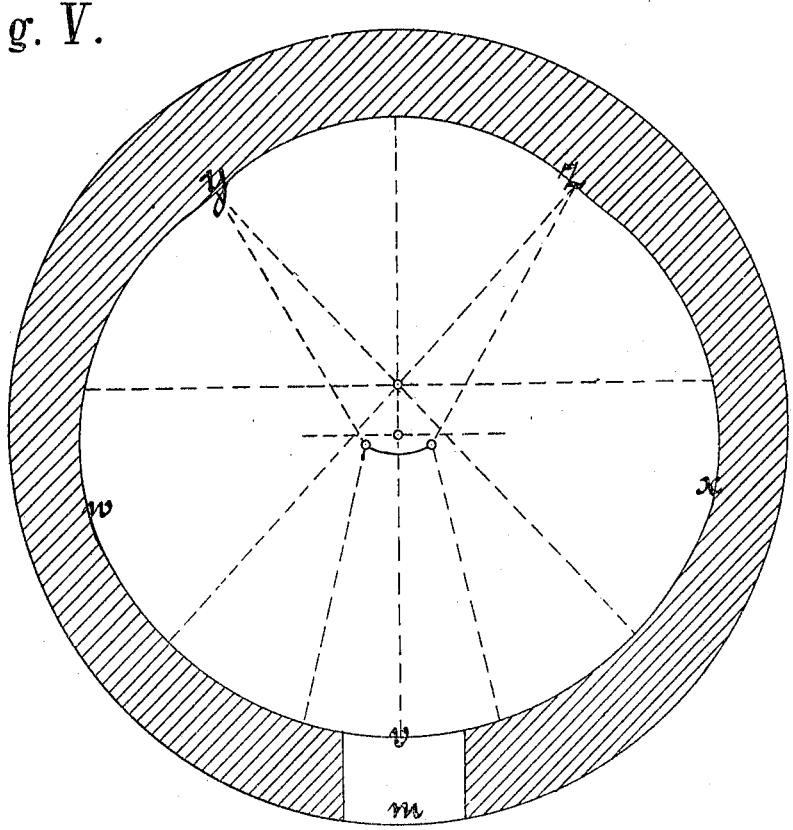
Fig. VI.
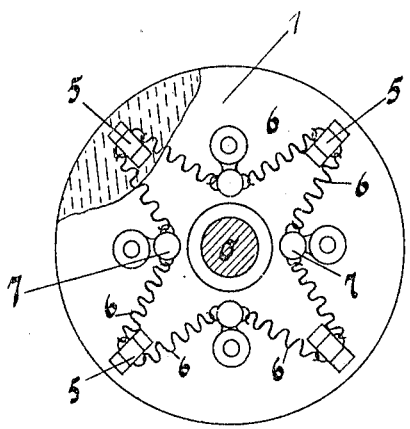
Witnesses:
Inventors:

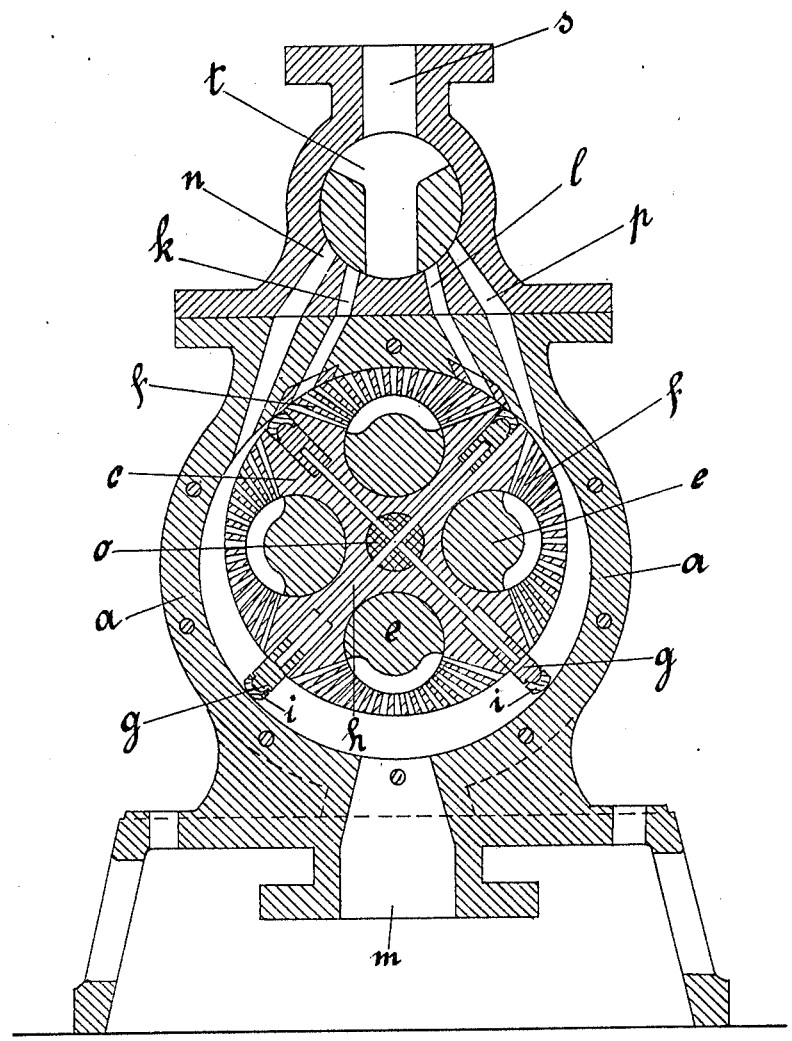
Fig. I.

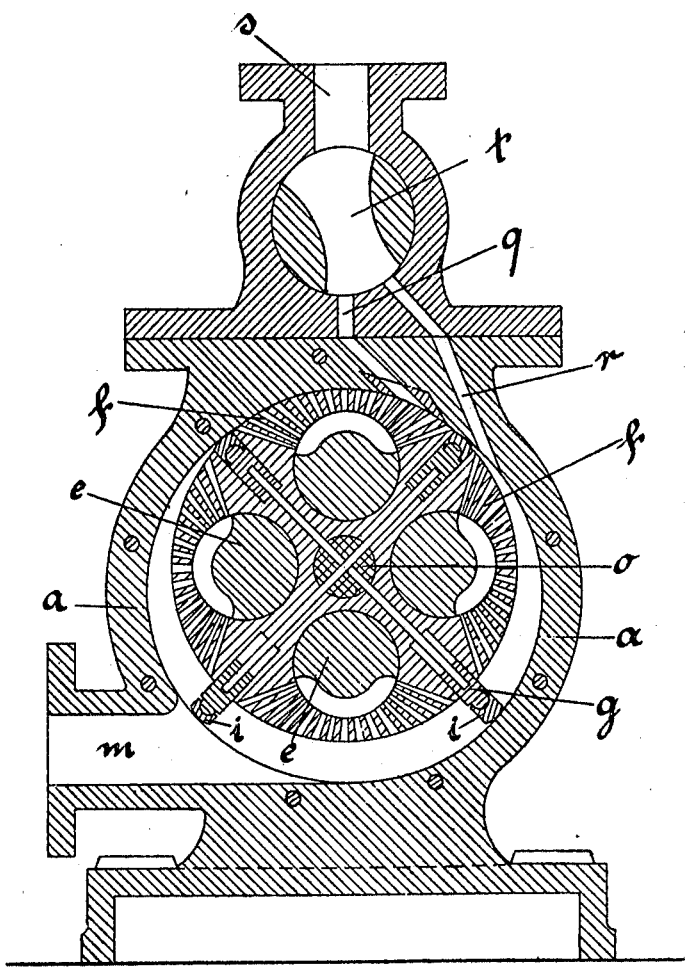

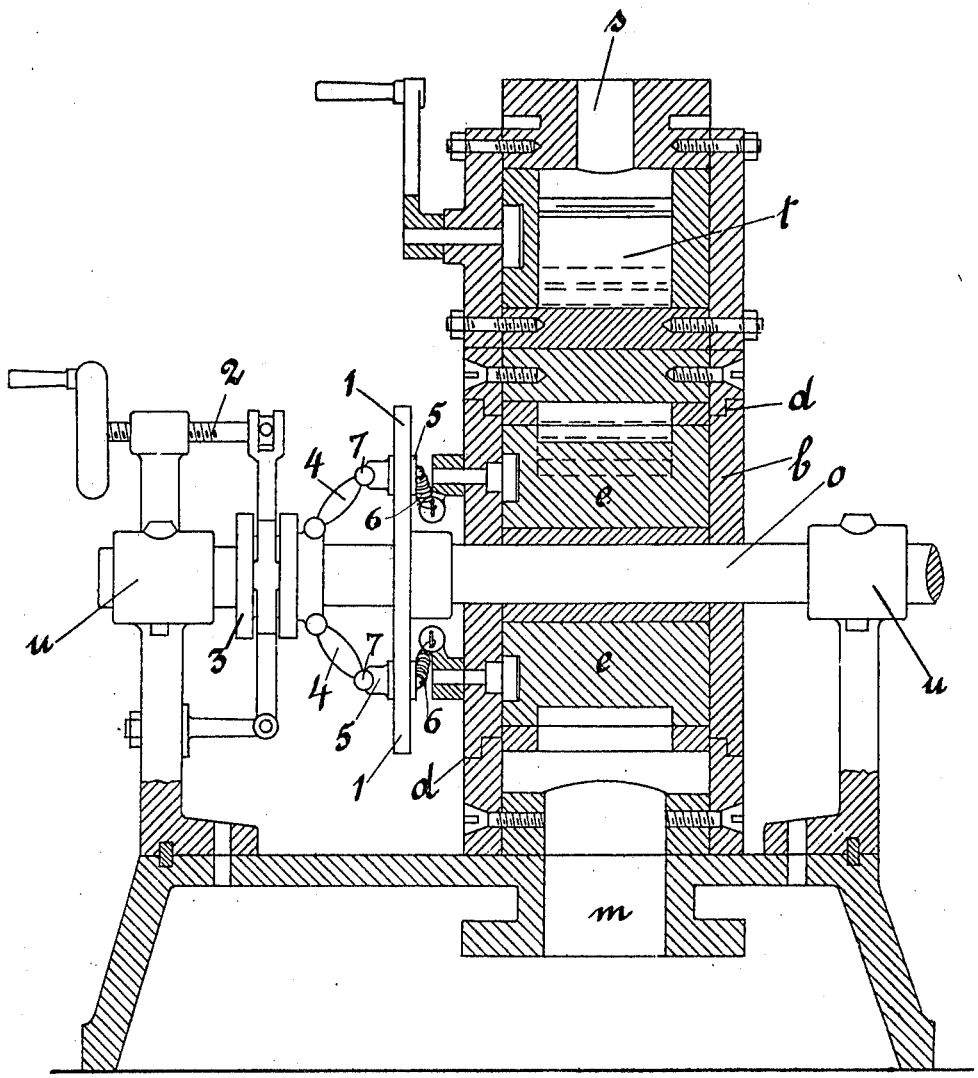

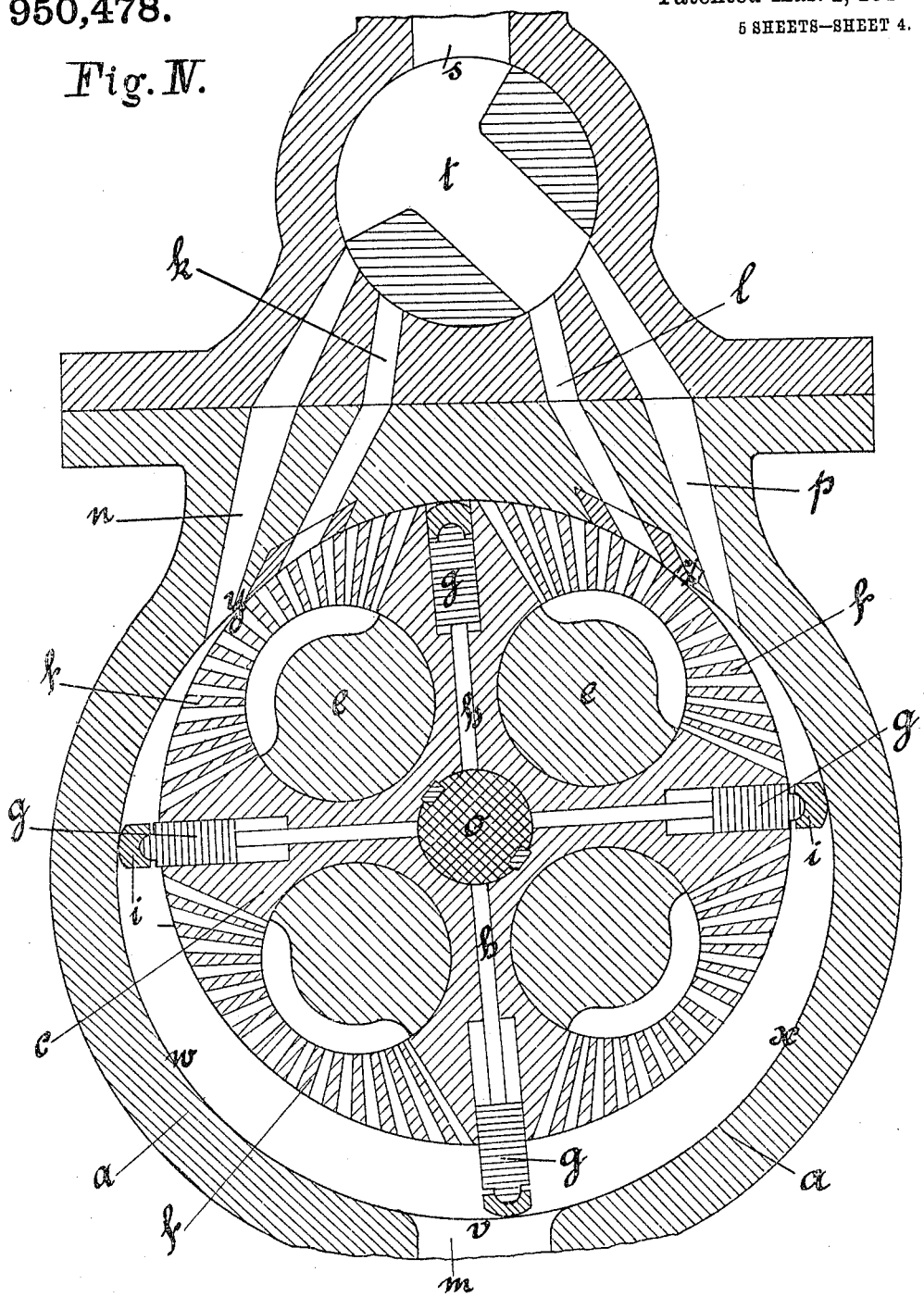

UNITED STATES PATENT OFFICE.

TOSSANUS DUYSENS, JOHAN REGINUS HENRI DE JONG, AND HENDRICUS LUDOVICUS KNEPPERS, OF MAASTRICHT, NETHERLANDS.

ROTARY ENGINE.

950,478.     Specification of Letters Patent.     Patented Mar. 1, 1910.

Application filed November 11, 1907. Serial No. 401,734.

*To all whom it may concern:*

Be it known that we, TOSSANUS DUYSENS, JOHAN REGINUS HENRI DE JONG, and HENDRICUS LUDOVICUS KNEPPERS, citizens of the Kingdom of the Netherlands, residing in Maastricht, Netherlands, have invented a new Rotary Engine, of which the following is a complete specification, reference being had to the accompanying drawings.

The present invention pertains to rotary engines calculated for right and left driving or for one-sided driving and provided with variable and adjustable expansion.

The present invention is of such a nature that the paddle protruding from a piston body during the revolution thereof is made use of, with the projections of the exit parts of the working piston in such a manner that these projections are also utilized as paddles. By this means the utilization of the steam efficiency is rendered more complete, because simultaneously or alternately the steam pressure can be directed against the projection paddles or against the piston paddles, or against both together, with uniform expansion effect of the steam passing out between the projections or of that against the piston paddles. This arrangement has the special advantages that there can be a change made always momentarily from the minimum up to the maximum inherent efficiency of the rotary engine, a property which in many branches of industry is very desirable. The rotary engine thus operates like an electromotor. Jerks in the moving parts which are liable to cause breakages are rendered impossible, because the rotary engine owing to the arrangement of the steam inlet will only give out the power which is required of it at the moment. It can also work immediately with steam of opposite direction.

The accompanying drawings illustrate the improved rotary engine.

Figure 1 is a longitudinal section of the right and left revolving machine. Fig. 2 is a similar section of a preferably right revolving machine. Fig. 3 shows a transverse section with the springs omitted. Fig. 4 is a longitudinal section on an enlarged scale. Figs. 5 and 6 show details relating to the outer casing and the control mechanism.

Within the casing $a$ (Figs. 1, 2, 3 and 4) there is placed upon the axis $o$ the disks $b$ closing the said casing and the revoluble piston $c$. The disks $b$ render, by means of their surfaces of contact, the interior of the casing completely steamtight. The revoluble piston is provided inside the slides $e$ and at its periphery with the steam plates $f$ which occupy with the openings lying between them, an entire segment of the periphery of the driving piston. Between two of these segments are arranged the wings $g$ which are placed in such a form in the piston upon rods $h$ that the opposite ones always rest against the inner peripheral surface of the casing. In order more perfectly to achieve this purpose, there are placed upon the ends of the wings or paddles $g$ so-called shoes $i$ which, owing to their curved outer surface, apply themselves according to the direction of revolution of the piston against the periphery and thereby secure a reliable steam-tightness. In order however, to assure a similar tightness of the driving piston $c$ or of the paddles $g$ against the inner periphery of the casing, at the place where the plates $f$ come into play as paddles for the steam pressure in front of the openings of the steam inlet channels $k$, $l$ there is provided the casing arch $y$, $z$ (Fig. 5) fitted to the diameter of the driving piston $c$ or of the paddles $g$ against the inner periphery of the casing while for the development of the expansive force of the steam in continuous revolution of the piston or of the greater protrusion of the paddles $g$ the side parts $w$, $x$ (Fig. 5) of the inside of the casing are formed up to their undermost junction, which takes place at the pivot $v$, of eccentric shape. The steam outlet $m$ is also placed at the point $v$ (Figs. 1, 2, 3, 5). By this construction of the inner casing space there is secured on the one hand to keep steamtight the piston periphery of one segment of blades over against the steam inlet opening and on the other hand corresponding to the expansion of the entering steam to offer the necessary pressure surface to the paddles proceeding out of the body of the piston; in this construction the distance between the opposed paddles and the points of the inner casing wall which come in contact with them remain the same. Such steam inlet channels are provided for the right and the left revolution of the rotary engine to the extent of four namely k, l, n, p (Figs. 1 and 4). For one side turning only two, for instance q, r are necessary (Fig. 2). With the first of these k, l serve for the segment plates f if they are under the channels even without reference to the respective slides e and when the plates then serve as paddles. If the plates proceed farther, then the slide e effects the closing of certain channels which lie between the plates and admits of the introduction of an expansion system. In the one sided machines (Fig. 2) the channel q serves for this purpose.

The outer steam conducting channels n, p (Figs. 1 and 4) and r (Fig. 2) also conduct the steam to the plates and paddles. The disposition of the steam inlet channels k, l, n, p (Figs. 1 and 4) and q r (Fig. 2) is necessary for the utilization of the smallest and the greatest power efficiency of the machine, because it can occur that suddenly the transfer from the smallest to the greatest power becomes necessary and vice versa, as for instance in ships, in rolling mills and so forth. In such cases the rotary engine works with full efficiency in its respective rotation from the respective channels k, n or l, p (Figs. 1 and 4) or q, r (Fig. 2). If a diminished power is required, then the inlet channel n or p or r can be closed and the channel k or l or q then supplies the working steam between the plates f against the paddle g. The rotary engine consequently works with full pressure, with adjustable expansion, or with full pressure and fixed expansion, according to the amount of power which is required from it.

It is obvious that through the arrangement of the steam inlet channels placed on both sides k, n, l, p (Figs. 1, 2) a right or left revolution of the driving piston c is assured together with a minimum and maximum power effect. Each can be immediately adjusted as the admission of the steam is regulated by means of the cock t placed on the pipe s. The channels on the other side lying opposite the turning side are of course then closed. Further it is obvious that in the case of the one-sided rotary engine, such for instance as that shown in Fig. 2, a right sided operation can be effected in the same manner. The axis o is supported outside of the casing a revolubly in the bearings u. It carries a pulley 1 (Figs. 3 and 6) which by means of the screw 2 can be moved to and fro. It serves for the adjustment of the automatically acting expansion. For this purpose between the part 1 and the rings 3 arms are inserted movable in the blocks 5, so that on their displacement of the rings 3 these blocks move farther from the center of the axis and on the return they approach it again. To these little blocks 5 are connected by means of spring 6 on both sides the weighted levers 7, so that these latter are always kept by the blocks 5 in a certain tension. If the rotary engine is at work, then the revolving slides e possess by reason of their weighted lever ends 7 the tendency to move in the direction of the centrifugal force, while the springs opposed to the rotation tend to restrict this to a limited degree, the amount of which however, is dependent upon the forward or backward displacement of the disk 1. The turning of the slides e, d, i and the alteration of the expansion consequently are effected automatically.

Having thus described our invention, what we claim is:

1. In an improved rotary engine with variable and adjustable expansion, paddles and steam plates between the paddles forming a segment of the driving piston periphery, means whereby said paddles are guided in the casing, in combination with the paddles protruding from the piston body to absorb the full and expanding steam pressure, for the purpose of a right or a left driving with increased or diminished efficiency, substantially as set forth.

2. In an improved rotary engine with variable and adjustable expansion, paddles and steam plates between the paddles forming a segment of the driving piston periphery, means whereby said paddles are guided in the casing, in combination with the paddles protruding from the piston body to absorb the full and expanding steam pressure, for the purpose of a right or a left driving with increased or diminished efficiency, the driving piston with the steam plates placed in a segment thereof fitting steamtight against the inner upper peripheral surface of the casing, and against the inner steam inlet channels, and the adjacent curved surface guiding compulsorily pairwise the opposed paddles up to their junction in eccentric form on both sides.

3. In an improved rotary engine with variable and adjustable expansion, paddles and steam plates between the paddles forming a segment of the driving piston periphery, means whereby said paddles are guided in the casing, in combination with the paddles protruding from the piston body to absorb the full and expanding steam pressure, for the purpose of a right or a left driving with increased or diminished efficiency, the driving piston with the steam plates placed in a segment thereof fitting steamtight against the inner upper peripheral surface of the casing, and against the inner steam inlet channels, and the adjacent curved surface guiding compulsorily pairwise the opposed paddles up to their junction in eccentric form on both sides, disks placed upon the driving axle and revolving with the working piston, said disks assuming in the surfaces of the casing the necessary closure thereof to the outside.

In testimony of all which we have hereunto subscribed our names.

TOSSANUS DUYSENS.
JOHAN REGINUS HENRI DE JONG.
HENDRICUS LUDOVICUS KNEPPERS.

Witnesses:
C. KOOT,
AUG. F. MCCHURCH.